United States Patent Office 2,839,548
Patented June 17, 1958

2,839,548

PROCESS FOR PURIFYING AMINO ACIDS

Clau Berther, Chur, and Marco Itin, Trins, Switzerland, assignors to Inventa A.-G., für Forschung und Patentverwertung, Lucerne, Switzerland No Drawing. Application November 6, 1956
Serial No. 620,595

Claims priority, application Switzerland
November 12, 1955

4 Claims. (Cl. 260—404)

The present invention relates to a process for purifying amino acids.

Commercially prepared amino acids often contain acid and/or basic impurities. Different processes have been proposed to remove these impurities. Thus, it is known to produce acid or basic salts of the amino acids with mineral acids or mineral alkalies and to purify these salts by fractional crystallization. In this process, however, the recovery of the free amino acids is difficult and not commercially feasible.

It has also been proposed to remove by means of ionic exchangers the mineral acid residues or the salt forming metal cations from the amino acids but this process needs several operations to carry it out, so that it has also been attempted to effect the separation and purification of amino acids directly by treatment with ionic exchangers. In this, however, for the elution of amino acids from the ionic exchangers, mineral acids or mineral alkalies are again used. To remove these mineral acids or mineral alkalies, a further treatment with other ionic exchangers is required. Also the acidity of the eluates must continuously be controlled.

A considerable improvement in the purification and separation of amino acids can be brought about by taking these up in aqueous solution on cation exchangers and undertaking the elution with bases volatile in steam whose dissociation constant is smaller than that of the amino group of the amino acid, since then there is present in the eluate after the evaporation the free amino acid or its inner salt. The pK value of such bases amounts preferably to a value of 4 to 12. Such weak bases are for example solutions of ammonia or pyridine. The corresponding process for the removal of acid impurities from solutions of amino acids, namely the taking up of the amino acid on an anion exchanger and the elution with a weak acid whose dissociation constant is smaller than that of the carboxylic group of the amino acid presents a more difficult problem.

It has been found in accordance with the present invention that amino acids bound to strong anion exchangers can readily be eluted if the anion exchangers are treated in aqueous suspension with carbon dioxide under pressure. While under normal pressure, the carbonic acid does not make it possible to elute any amino acid from an anion exchanger, by considerably raising the partial pressure of the carbon dioxide above the liquid, the concentration of dissolved carbon dioxide is so increased that the displacement of the amino acid bound to the anion exchanger is possible. Suitable pressures for this purpose amount to 20 to 150 atmospheres. Fundamentally, for the elution of the amino acids from anion exchangers, other soluble materials volatile in steam which contain one or more weakly acid groups are also suitable. The pK values of these acid groups, vary according to the amino acid to be eluted, and are preferably from 1.5 to 10, which corresponds with that in acetic acid, propionic acid or sulphurous acid. For shortening the reaction time, the temperature of the acid solution can be increased to 60° C.

In accordance with the present invention, by treating with cationic and anionic exchangers, both basic and acid impurities can be removed from technically pure amino acids, to obtain amino acids of high purity with extraordinarily small losses. Instead of the raw amino acids, their lactams can be used as starting materials for the production of pure amino acids, since lactams in known manner (U. S. application No. 546,279, Itin and Kahr) can be hydrolyzed on cation exchangers to the corresponding amino acids. The amino acid adsorbed on a cation exchanger is dissolved in known manner in aqueous ammonia solution and this solution which still contains about 0.1% of ammonia is then treated with an anion exchanger. After the charged anion exchanger has been washed with water and if desired alcohols, it is treated in aqueous suspension with carbon dioxide under a pressure of preferably 40 to 80 atmospheres, whereby the amino acid is quantitatively eluted. After decompression of the pressure vessel, the exchanger is filtered and the aqueous solution evaporated to dryness which preferably takes place under reduced pressure. The amino acid thus obtained is of high purity.

As cation exchangers, any commercially strong acid exchanger, e. g. "Amberlite IR–120" or "Dowex" 50 (sulphonate polysterols) can be used, while as anion exchangers, any commercially strongly basic exchanger may be used, e. g. "Amberlite IRA–400" or "Dowex" 2 (polysterols with quaternary amino groups). The charging of the exchanger with the amino acid as well as the subsequent elution take place at temperatures of 10 to 80° C. but for hydrolysis of any lactam present in the acid exchanger, temperatures of 70 to 100° C. are necessary. The said cation exchangers can be charged with about 2 moles of amino acid per litre of damp exchanger and the anion exchangers with about one mole of amino acid per litre of damp exchanger. By regeneration of the exchangers with acids and bases, ammonium salts and carbonates can be obtained and furthermore by evaporation of the weakly ammoniacal wash water, additional quantities of ammonia can be recovered.

The purification process described can be operated continuously in a simple way by the use of several exchange columns.

The following examples are intended to explain the invention in greater detail without however limiting it.

*Examples*

(1) 8–9 parts of beta-alanin (M. P. 288 to 290° C.) are dissolved in 100 parts by volume by water and, in a vessel with a stirrer, adsorbed on 100 parts by volume of damp activated cation exchanger "Amberlite IR–120." The cation exchanger is filtered off and washed with 100 parts by volume of water, and then treated with 100 parts by volume of a 3% aqueous solution of ammonia. There is obtained an aqueous solution of beta-alanin which contains still about 0.1% of ammonia. This solution is treated in a vessel with a stirrer with 150 parts by volume of damp activated anion exchanger "Amberlite IRA–410." The exchanger after being filtered off is washed with 100 parts by volume of water and 50 parts by volume of methanol and then covered in an autoclave with 100 parts by volume of water. Then it is treated for 10 hours with carbon dioxide at 40 atmospheres pressure. After the release of pressure, the anion exchanger is separated from the solution and this is evaporated in vacuo dryness. There is obtained 8.8 parts by weight of pure beta-alanin of melting about 295° C.

(2) 11.3 parts by weight of technical epsilon-caprolactam are hydrolyzed on 100 parts by volume of the damp cation exchanger "Amberlite IR–120" to 13.1 parts by weight of epsilon-aminocaproic acid (see copending application Serial No. 546,279). The aminoacid is dissolved out of the exchanger with 100 parts by volume with a 3% aqueous ammonia solution and the resulting solution is finally treated with 150 parts by volume of damp activated anion exchanger "Amberlite IRA-400." The exchanger is filtered, washed with 100 parts by volume of water and 50 parts by volume of methanol and then covered in an autoclave with 100 parts by volume of water. Then, it is treated for 10 hours with carbon dioxide at 60 atmospheres pressure. After this, the pressure is released, and the exchanger is filtered and washed with water. The solution is evaporated in vacuo to dryness. There is obtained 12.9 grams of pure epsilon-aminocaproic acid of melting point of 203° C.

(3) 20.1 parts by weight of raw omega-aminodecanoic acid (melting point 178–181° C.) are dissolved in 150 parts by volume of a methanol-water mixture (1:1) and taken up in a vessel with a stirrer on 100 parts by volume of damp activated cation exchanger "Amberlite IR-120." The cation exchanger is filtered, washed with 100 parts by volume of water and then treated with 100 parts by volume of a 13% methanolic pyridine solution. The solution formed of the omega-aminoundecanoic acid is filtered off and treated with 150 parts by volume of damp activated anion exchanger "Amberlite IRA-410." The filtered anion exchanger is washed with water and methanol as in Example 1 and covered in an autoclave with 100 parts by volume of a methanol-water mixture (1:1). After this, it is treated for 5 hours at a temperature of 40° C. with carbon dioxide under pressure of 70 atmospheres. After the release of pressure, the exchanger is filtered and the solution at reduced pressure evaporated to dryness. There is obtained 19.9 parts by weight of pure omega-aminodecanoic acid of melting point 186–187° C.

What is claimed is:

1. A process for removing acid impurities from an amino carboxylic acid, which comprises subjecting a solution of the acid to treatment in an anionic exchanger, and eluting the adsorbed acid in said exchanger with an aqueous suspension containing carbon dioxide under pressure of 20–150 atmospheres.

2. A process for removing acid impurities from an amino carboxylic acid soluble in a solvent of the class consisting of water and alcohol, which comprises subjecting a solution of the amino acid to treatment in an anionic exchanger, washing the anionic exchanger in which the amino acid is adsorbed with a solvent from the group consisting of water, alcohol and mixture of water and alcohol, and eluting the adsorbed acid in the anionic exchanger with an aqueous suspension containing carbon dioxide under pressure of 20–150 atmospheres.

3. A process for purifying $\epsilon$-amino caproic acid made from $\epsilon$-caprolactam, which comprises hydrolyzing aqueous $\epsilon$-caprolactam in a cationic exchanger, eluting the $\epsilon$-amino caproic acid from the cationic exchanger with aqueous ammonia, adsorbing the $\epsilon$-amino caproic acid in an anionic exchanger, washing the anionic exchanger with a mixture of water and methanol, and eluting $\epsilon$-amino caproic acid from said anionic exchanger with aqueous carbon dioxide under a pressure of 20–150 atmospheres.

4. A process for removing acid impurities from $\epsilon$-amino caproic acid, which comprises adsorbing the $\epsilon$-amino caproic acid in an anionic exchanger, washing the anionic exchanger with a liquid of the class consisting of water, alcohol and a mixture of alcohol and water, and eluting the $\epsilon$-amino caproic acid from said exchanger with aqueous carbon dioxide under a pressure of 20–150 atmospheres.

References Cited in the file of this patent

Block: Archives of Biochem. 11, 235–248 (1946).